United States Patent
Guan (10) Patent No.: US 7,821,963 B2
(45) Date of Patent: Oct. 26, 2010

(54) METHOD FOR A ROOT PATH CALCULATION IN A SHORTEST PATH BRIDGE

(75) Inventor: Hongguang Guan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 10 days.

(21) Appl. No.: 12/394,602

(22) Filed: Feb. 27, 2009

(65) Prior Publication Data

US 2009/0161584 A1    Jun. 25, 2009

Related U.S. Application Data

(63) Continuation of application No. PCT/CN2007/070597, filed on Aug. 30, 2007.

(30) Foreign Application Priority Data

Aug. 30, 2006  (CN) .................. 2006 1 0111994

(51) Int. Cl.
*G01R 31/08* (2006.01)
*G01F 11/00* (2006.01)
*H04L 12/28* (2006.01)
*H04L 12/56* (2006.01)

(52) U.S. Cl. ............... 370/252; 370/256; 370/401

(58) Field of Classification Search .............. None
See application file for complete search history.

(56) References Cited

U.S. PATENT DOCUMENTS

| | | | |
|---|---|---|---|
| 6,202,114 | B1 | 3/2001 | Dutt et al. |
| 6,519,231 | B1 | 2/2003 | Ding et al. |
| 6,697,339 | B1 | 2/2004 | Jain |
| 7,352,707 | B2 * | 4/2008 | Ho et al. ............ 370/256 |
| 2002/0196795 | A1 | 12/2002 | Higashiyama |
| 2004/0190454 | A1 | 9/2004 | Higasiyama |
| 2005/0138008 | A1 | 6/2005 | Tsillas |
| 2007/0036161 | A1 * | 2/2007 | Mahamuni ............ 370/392 |

FOREIGN PATENT DOCUMENTS

| | | |
|---|---|---|
| CN | 1722705 A | 1/2006 |
| KR | 2004-0009467 A | 1/2004 |

OTHER PUBLICATIONS

English Translation of Written Opinion of International Patent Application No. PCT/CN2007/070597.

Liang, "Research and Realization of Intermediary System-Intermediary System (IS-IS) Routing Protocol," National University of Defense Technology, Master Thesis (Mar. 15, 2006).

Finn, "Shortest Path Bridging: An Update on Bridging Technologies," IEEE Tutorial, 1-25 (Jul. 18, 2005) http://groupter.ieee.org/groups/802/802_tutorials/05-July/nfinn-shortest-path-bridging.pdf [retrieved on Jun. 23, 2009].

* cited by examiner

*Primary Examiner*—Chirag G Shah
*Assistant Examiner*—Ashley L Shivers
(74) *Attorney, Agent, or Firm*—Leydig, Voit & Mayer, Ltd.

(57) ABSTRACT

A method for root path calculation in a shortest path bridge, including: in the case that there are a plurality of equivalent paths whose total path cost to a root bridge is equal, determining a root path corresponding to the root bridge based on the minimum/maximum value of bridge ID in the plurality of equivalent paths. The method can generate symmetric paths for different root bridges under a multiple spanning tree circumstance of shortest path bridge.

15 Claims, 3 Drawing Sheets

METHOD FOR A ROOT PATH CALCULATION IN A SHORTEST PATH BRIDGE

CROSS-REFERENCE TO RELATED APPLICATION

This application is a continuation of International Patent Application No. PCT/CN2007/070597, filed Aug. 30, 2007, which claims priority to Chinese Patent Application No. 200610111994.X, filed Aug. 30, 2006, both of which are hereby incorporated by reference in their entirety.

FIELD OF THE INVENTION

The present invention relates to the field of network communications, and more particularly, to a method of root path calculation in a shortest path bridge.

BACKGROUND

Figure 1:
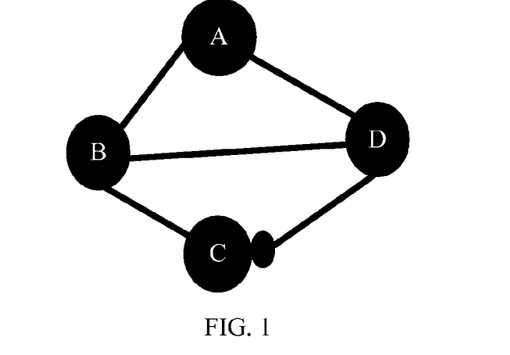
FIG. 1 is a schematic view of a network structure connected through Ethernet bridges.

In a conventional network interconnected through Ethernet bridges, because the same and unique spanning tree is adopted to forward data in the same broadcast domain, it generally cannot ensure that data packets are forwarded along the shortest path, and as a result, the data packets are intensely transmitted merely in some links. For example, as shown in FIG. 1, in the network interconnected through Ethernet bridges, A represents a root bridge, B and C are blocked, and so are C and D. Therefore, even though both B and D have straight links to C, data packets from B and D to C must be forwarded by A first and then reach C, so that the bandwidths between B and C, and C and D are wasted.

In order to enable a bridge to forward data packets along a shortest path, currently, the shortest path bridge project team of an International organization for Standardization IEEE (Institute for Electrical and Electronics Engineers) and the TRILL (Transparent Interconnection of Lots of Links) project team of an International organization for Standardization IETF (Internet Engineering Task Force) have respectively organized researches according to two different methods.

In the method adopted by the shortest path bridge project team of the IEEE, a spanning tree is still adopted to forward all the data packets. However, each bridge in the whole network acts as a root bridge to generate a tree, and establish their respective forwarding trees. In order to forward data packets, including broadcast packets, multicast packets, unknown packets, or unicast packets, along the shortest path, during the process of forwarding data packets, a first bridge where a data packet firstly arrives is taken as a root, and then the data is forwarded, according to a forwarding tree established by the bridge itself. In other words, the entrance is taken as the root to forward data. Therefore, according to the method, a plurality of spanning trees may be employed in the same broadcast domain to forward data.

In the method adopted by the TRILL project team of the IETF, a bridge has routing calculation and forwarding functions similar to a router. Therefore, the bridge in this method is also called a route bridge (Rbridge). Each Rbridge can form a "Rbridge network topology" based on a link-state protocol and, accordingly, calculate a shortest path to any other destination Rbridge. As for a unicast packet, each Rbridge can forward a unicast packet along the shortest path, according to the address of an exit Rbridge corresponding to the data packet (not based on the address of the final destination node, i.e. not based on the MAC address of a destination host). In addition, a network including Rbridges may calculate a spanning tree, according to the network topology, and broadcast packets, multicast packets, and unknown packets are all forwarded, according to the spanning tree.

In order to avoid significantly modifying the hardware through adding Time To Live (TTL) process in the loop, in the method adopted by the TRILL project team of the IETF the spanning tree is merely modified, which slightly affects the hardware changes. Therefore, at present, in the research on the shortest path bridge, the IEEE has proposed two solutions around the spanning tree.

1. A spanning tree is established by employing original spanning tree protocols: Rapid Spanning Tree Protocol and Multiple Spanning Tree Protocol (RSTP/MSTP). This solution is the focus of the current study made by the IEEE.

2. A spanning tree is established by employing Intermediate system-Intermediate system (IS-IS) or Open Shortest Path First Protocol (OSPF).

In Solution 2, after a spanning tree is established by the IS-IS, because each bridge knows the topology of the whole network, and the spanning tree established by each bridge includes the spanning trees of the whole network, each bridge knows the branch of the spanning tree where any node is located, and knows how to forward data, according to the established spanning tree.

In Solution 1, after a spanning tree is established by the spanning tree protocol, each bridge can only know a root port and a designated port of one spanning tree passing from the bridge, instead of the information about the whole spanning tree. Therefore, if a unicast packet is forwarded by taking an entrance as the root, each bridge does not know the branch of the spanning tree where a destination address accesses, so that the bridge obtains a forwarding path by address learning.

Figure 2:
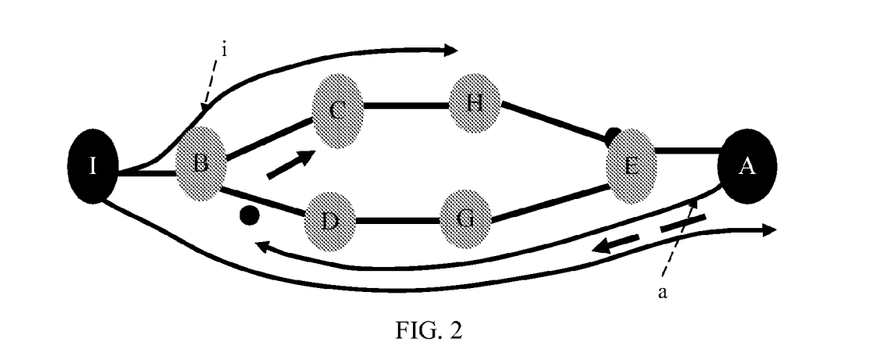
FIG. 2 is a schematic view of a network structure connected through Ethernet bridges.

However, the spanning tree of each bridge is generated independently. When two or more equivalent paths exist, different spanning trees adopt different manners to block the equivalent paths when being generated independently, so that the path selections are inconsistent; and as a result, the forward and backward paths from one bridge to another are inconsistent. For example, in the network shown in FIG. 2, a path a (taking A as the tree root) from an edge bridge A to an edge bridge I is inconsistent with a path i (taking I as the tree root) from the edge bridge I to the edge bridge A. Therefore, the above forwarding mechanism taking an entrance as a root causes difficulties in address learning due to asymmetric paths; and as a result, a normal forwarding path cannot be obtained by a common source address learning method.

In order to overcome the learning obstacles caused by asymmetric paths in the above shortest path forwarding system taking an entrance as a root, in the conventional art, the IEEE proposes a symmetric path generation method of a PATH vector.

The basic principle for the symmetric path generation method of a PATH vector is to ensure that the path a from the edge bridge A to the edge bridge I is consistent with the path i from the edge bridge I to the edge bridge A. In order to implement the method, a N-bit PATH vector should be predetermined when establishing bridges through using MSTP, in which N cannot be less than the number of bridges in the network, and a fixed bit is assigned to each bridge.

In order to make the original MSTP protocol of the MSTP be compatible, designated Bridge ID in {Root ID, Root Path Cost, designated Bridge ID, Port ID} in a priority vector is replaced by a PATH vector, so the vector has 64 bits. In addition, an algorithm (or static configuration) is adopted in advance to ensure the costs of a link in forward and backward directions to be consistent.

In the above symmetric path generation method of a PATH vector, in the process of establishing multiple spanning trees, the PATH vector is created and propagated in the following manner.

Each bridge is taken as a tree root to initialize an empty PATH vector, and adds the PATH vector into a Bridge Protocol Data Unit (BPDU) message corresponding to the tree root for being propagated.

When a BPDU message carrying a PATH vector is propagated to a certain bridge, if the bridge determines that a port for receiving the BPDU message is a root port of the tree corresponding to the BPDU message according to a unique shortest root cost, and fills the position assigned thereto with 1 in the PATH vector contained in the BPDU message, locally stores the PATH vector, and then continues to propagate the BPDU message carrying the PATH vector to a non-root port. Otherwise, if the bridge calculates two shortest equivalent root costs of a corresponding tree, it carries out the following processes. Two PATH vectors corresponding to the two equivalent roots (the bit in the PATH vectors corresponding to the bridge is set as 1) are taken, and the path corresponding to one PATH vector is determined to be blocked, according to a specified rule. For example, the values of the two PATH vectors are respectively converted into a N-digit integer, and the vector with a larger value has its corresponding path blocked.

Figure 3:
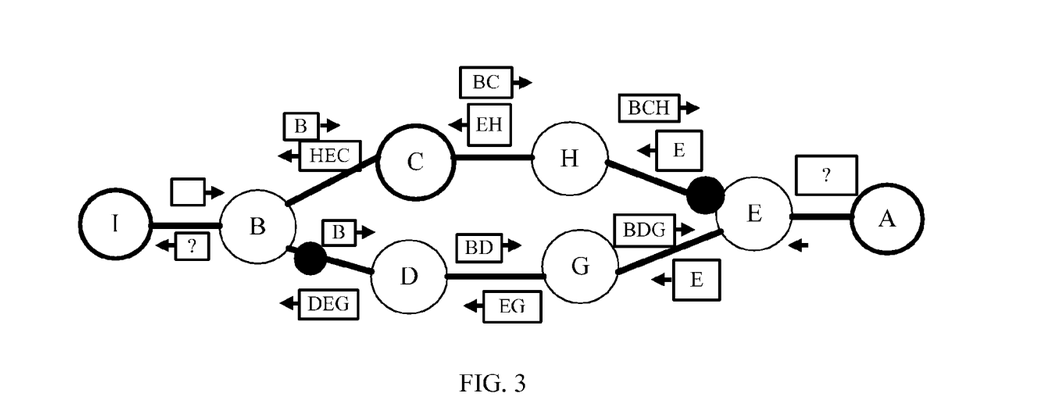
FIG. 3 is a schematic view of a network structure connected through Ethernet bridges.

As shown in FIG. 3, when the BPDU rooted at A is transmitted to E, the bridge E marks the position in the PATH vector corresponding to E with 1, and transmits the newly-constructed BPDU to H and G from two different ports, respectively. When receiving the BPDU rooted at A, H marks the position in the PATH vector corresponding to H with 1. When receiving the BPDU rooted at A, G marks the position in the PATH vector corresponding to G with 1. In this way, each bridge marks the corresponding position in the vector with 1 after receiving the BPDU rooted at A. When B receives the BPDU rooted at A from two different paths, the PATH vector is shown in the first two rows in Table 1, and when E receives the BPDU rooted at I from two different paths, the PATH vector is shown in the last two rows in Table 1.

TABLE 1

| | Path | | | | | | | | |
|---|---|---|---|---|---|---|---|---|---|
| | A | B | C | D | E | F | G | H | I |
| AEHCB | 1 | 1 | 1 | 0 | 0 | 0 | 0 | 1 | 0 |
| AEGDB | 1 | 1 | 0 | 1 | 0 | 0 | 1 | 0 | 0 |
| IBCHE | 0 | 1 | 1 | 0 | 1 | 0 | 0 | 1 | 1 |
| IBDGE | 0 | 1 | 0 | 1 | 1 | 0 | 1 | 0 | 1 |

The above method can ensure that, during the generation process of different spanning trees, when equivalent paths exist, the protocols of different spanning trees may determine the blocked paths, according to the two equivalent PATH vectors corresponding to the tree and the same blocking rule, thereby ensuring the consistency (symmetry) of forward and backward paths between two points, when using different spanning trees to forward data.

When implementing the present invention, the inventor finds out that the above symmetric path generation method of a PATH vector in the conventional art has the defects that, because the number of bits in the PATH vector is directly proportional to the network size, the number of bits in the PATH vector closely relates to the network scalability, so the method is inappropriate for the network scalability. For the compatibility of protocols, the current PATH vector is 64 bits, which obviously cannot satisfy the requirements of scalability.

In this method, the bit of each bridge needs to be allocated manually in advance, which means a heavy workload. In addition, once the bit allocated to a newly-added bridge in the network is made to be the same as that of another bridge by mistake, the two bridges with incorrect configurations can only be found out by searching all bridges one by one, and the whole network cannot be recovered automatically, thereby causing disastrous consequences to the whole network.

Under a special circumstance, two equivalent paths crossed the same bridge, but merely the ports are different. Such a problem may not be solved by this method. In addition, the method is only suitable for a point to point link, but still has the problem of path asymmetry in a multi-point access link.

SUMMARY

The present invention provides a method for root path calculation in a shortest path bridge, which is applicable for generating corresponding symmetric paths for different root bridges under a multiple spanning tree circumstance of the shortest path bridge.

The objective of the present invention is achieved by the following technical solutions.

A method for root path calculation in a shortest path bridge includes.

When a plurality of equivalent paths with an equal total path cost to a root bridge exists, determining a root path corresponding to the root bridge is based on a minimum/maximum value of bridge identifier (ID) in the plurality of equivalent paths.

As known from the technical solution of the present invention, the present invention selects a path to a root bridge, according to the maximum or minimum bridge ID in the equivalent paths, so as to generate symmetric paths for different root bridges under the multiple spanning tree circumstance of a shortest path bridge, which does not need to preset a vector bit for the generation of paths, thereby reducing the possibility of incorrect configurations.

Compared with the conventional art, the present invention has the following advantages.

1. Under the multiple spanning tree circumstance of the shortest path bridge, symmetric paths are generated for different root bridges, which do not need reconfiguration of a vector bit for the generation of paths, thereby reducing the possibility of incorrect configurations.

2. If the method provided by the prevent invention is applied in an Ethernet with an expanded frame length, for example, the frame length is expanded to over 1518 bytes (at present, some manufacturers have already expanded the conventional frame length of Ethernet to 9216 bytes and applied in practice), the limitation of 64 bridges may be easily broken through, thereby solving the problem in the conventional art that the BPDU frame format needs to be modified due to the increase of the vector bit for a path vector.

In order to support 128/256 bridges, the vector potential in the conventional art needs to be expanded to 128/256 bits (16/32 bytes), and the number of bytes in the BPDU is greatly increased, whereas the present invention compares through the MAC address, without increasing the number of bytes of the BPDU as the supported bridges are increased.

3. When a certain equivalent link fails or is modified, it does not need to determine each root bridge, respectively, and when the closest bridge is modified, the information of root port corresponding to the relevant influenced root bridges is also modified.

DETAILED DESCRIPTION

The present invention provides a method for root path calculation in a shortest path bridge. According to the present invention, a path to a root bridge is selected, according to a maximum or minimum bridge ID in each equivalent path.

Figure 4:
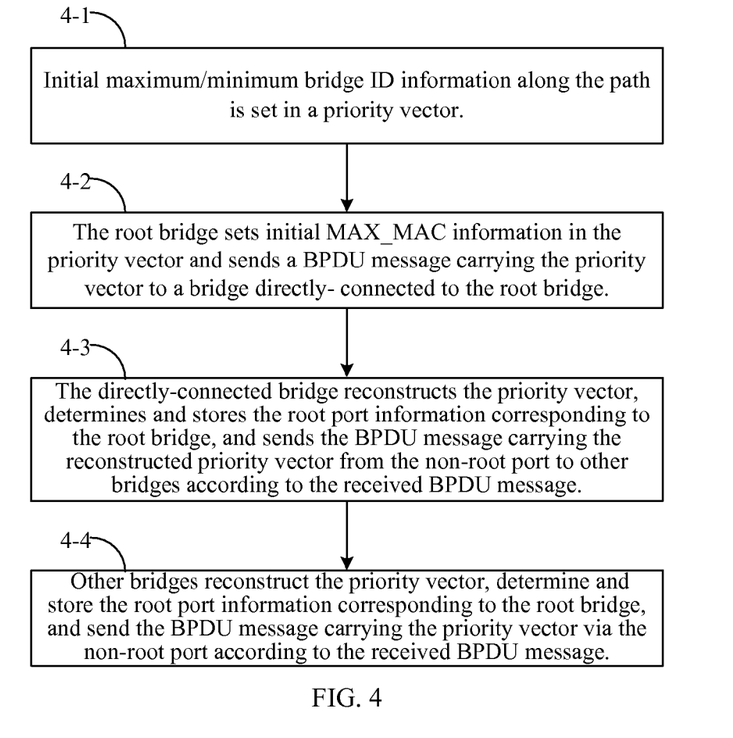
FIG. 4 is a flow chart of a method provided according to an embodiment of the present invention.

The present invention is described below by reference to the accompanying drawings. The method provided by the present invention is adapted to establish a symmetric tree in the shortest path bridge according to protocols, such as a spanning tree protocol, an IS-IS protocol, and an OSPF protocol. Taking the spanning tree protocol as an example, the flow chart of the method provided according to an embodiment of the present invention is shown in FIG. 4, which includes the following steps.

Block 4-1: Initial maximum/minimum bridge ID information along the path is set in a priority vector.

In the present invention, the maximum or minimum bridge ID information along the path is firstly added into {Root ID, Root Path Cost, designated Bridge ID, Port ID} in a conventional MSTP priority vector. Hereinafter, the method of the present invention is described below, by taking the maximum bridge ID in a bridge propagation path as an example. The bridge ID information may be a MAC address of the bridge or a unique bridge mark preset in a domain. Taking MAC addresses as an example, the bridge ID information is MAX_MAC_on_the_way (briefly referred to as MAX_MAC). Therefore, a new priority vector in the present invention is {Root ID, Root Path Cost, designated Bridge ID, designated Port ID, MAX_MAC}.

Figure 5:
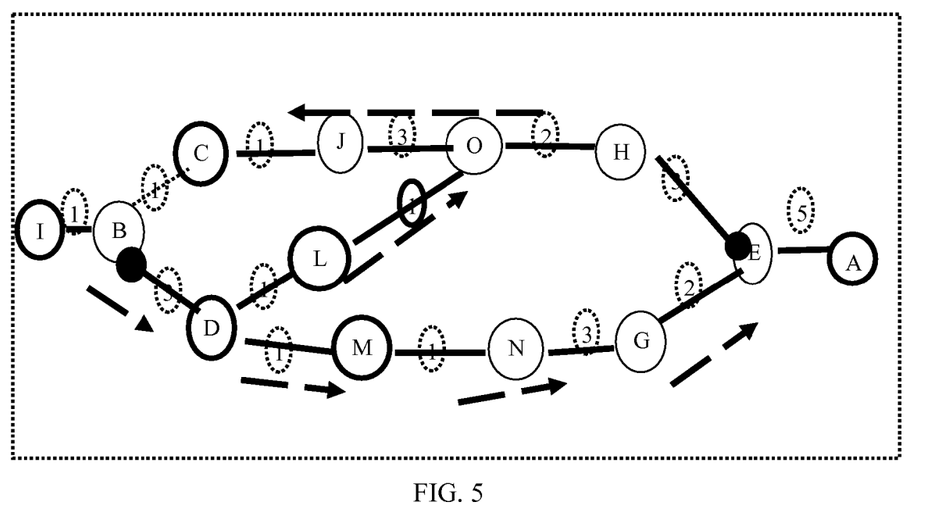
FIG. 5 is a schematic view of a network structure connected through Ethernet bridges.

For example, as shown in FIG. 5, in a network interconnected through Ethernet bridges, the MAC address of each bridge is replaced by one letter, i.e. the bridge ID, and the MAC addresses are listed in an order of magnitude: A<B<C . . . <L<M<N<O. The number in each line segment represents a port path cost, which is automatically calculated through an algorithm (relevant to a bandwidth supported by the port) or obtained through static configuration. As for two ports connected by one line segment, the port path costs must keep consistent.

In the network shown in FIG. 5, if spanning trees rooted at A and I are respectively established, according to the conventional multiple spanning tree protocol in the conventional art, the paths of the spanning trees rooted at A and I are asymmetric.

In the spanning tree rooted at A, the path cost (A-I) from root bridge A to I has three shortest equivalent paths, which are AEHOJCBI, AEHOLDBI, and AEGNMDBI. If the comparison is made based on {Root ID, Root Path Cost, designated Bridge ID, Port ID} in the conventional MSTP priority vector, i.e. comparing the designated Bridge ID, because D>C, the bridge B takes the B->C port as the root port and blocks the B->D port, and the block point is shown as a dot close to B in FIG. 5. Therefore, B selects the path AEHOJCB as a propagation path of the root bridge A.

In the spanning tree rooted at I, the path cost (I-A) from root bridge I to A similarly has the above three shortest equivalent paths. The comparison is also made based on {Root ID, Root Path Cost, designated Bridge ID, Port ID} in the conventional MSTP priority vector, i.e. comparing the designated Bridge ID. Because H>G, E selects to block the E->H port, and the block point is shown as a dot close to E in FIG. 5. Therefore, the spanning tree path from A to I selects IBDMNGEA, so the path from A to I is inconsistent with that from I to A.

In FIG. 5, many paths are equal and have a nested loop phenomenon, for example, E-H-O-L-D=E-G-N-M-D=7, B-D-L-O=B-C-J-O=5, and E-H-O-L-D-B=E-G-N-M-D-B=B-C-J-O-H-E=10. Assuming these paths are all shortest ones, in the present invention, there is a need to select a symmetric path from these shortest paths.

Block 4-2: The root bridge sets initial MAX_MAC information in the priority vector, and sends a BPDU message carrying the priority vector to a directly-connected bridge to the root bridge.

In order to establish a spanning tree, first, if a maximum bridge ID is adopted, the root bridge sets all bits of the initial MAX_MAC as 0. If a minimum bridge ID is adopted, all bits of the initial MAX_MAC are set to F. The initial MAX_MAC is set into the priority vector, and a BPDU message carrying the priority vector is sent to the directly-connected bridge of the root bridge.

In the network shown in FIG. 5, for example, the bridge A is taken as the root bridge, and the priority vector in the BPDU message sent from A to the directly-connected bridge E is {Root ID=MAC_A, Root Path Cost=0, designated Bridge ID=MAC_A, designated Port ID=1, MAX_MAC=0}. Root Path Cost represents a total path cost. At this time, the path cost is the cost of the path A-A, so Root Path Cost=0. Designated Bridge ID represents a designated bridge ID. Designated Port ID represents a designated Port Number.

Block 4-3: The directly-connected bridge reconstructs the priority vector, determines and stores the root port information corresponding to the root bridge, and sends the BPDU carrying the reconstructed priority vector from the non-root port to other bridges, according to the received BPDU message.

After receiving the BPDU message sent from the root bridge, each directly-connected bridge reconstructs a new priority vector, and calculates new path cost information in the new priority vector: new root path cost=root path cost+ port path cost. Then, a new MAX_MAC is determined, as well as the root port information corresponding to the root bridge.

The directly-connected bridge determines the new MAX_MAC in the following manner. The directly-connected bridge compares its own SELF_MAC with the MAX_MAC in the BPDU message. If SELF_MAC>MAX_MAC, the new MAX_MAC is SELF_MAC, and if SELF_MAC<MAX_MAC, the new MAX_MAC is still the MAX_MAC in the priority vector.

How the directly-connected bridge specifically determines the root port information corresponding to the root bridge is described later on.

The directly-connected bridge stores the determined new root path cost, MAX_MAC and Port ID information corresponding to the root bridge A, and, respectively, sends the BPDU messages carrying the corresponding reconstructed priority vectors from each non-root port.

In the above example with the bridge A as the root bridge, after receiving the BPDU message sent from A, E calculates the new root path cost=5+0=5. Because E>A, MAX_MAC=E. The Port ID corresponding to the root bridge A selected by E is 1.

Then, E stores the new root path cost, MAX_MAC and Port ID information corresponding to the root bridge A into a local database. Different priority vectors are respectively set for different non-root ports. The new root path cost, MAX_MAC and Port ID information corresponding to the root bridge A are set in the priority vector, and the BPDU messages carrying the corresponding priority vectors are sent from each non-root port, respectively.

In the above example with the bridge A as the root bridge, the priority vectors of E for the bridges H and G are, respectively, {MAC_A, 5, MAC_E, 2, MAC_E} and {MAC_A, 5, MAC_E, 3, MAC_E}. Herein, the designated Bridge ID becomes MAC_E. Port IDs are different, because the ports for E to be connected to H and G are, respectively, 2 and 3. Then, the bridge E respectively sends the BPDU message carrying the priority vector from the ports 2 and 3.

Block 4-4: Other bridges reconstruct the priority vector, determine and store the root port information corresponding to the root bridge, and send the BPDU message carrying the priority vector via the non-root port, according to the received BPDU message.

After receiving the BPDU message sent from the directly-connected bridge, each of the other bridges reconstructs a new priority vector, calculates a new path cost information of the new priority vector: new root path cost=root path cost+port path cost, and determines a new MAX_MAC, according to the manner of determining the MAX_MAC by the root bridge. Meanwhile, the root port information corresponding to the root bridge is determined.

Each of the other bridges stores the determined new root path cost, MAX_MAC, and root port information corresponding to the root bridge A, sets a new priority vector, and sends the BPDU message carrying the corresponding priority vector from each non-root port, respectively.

In the network shown in FIG. 5, each bridge takes itself as a root bridge to send the BPDU message to establish its own spanning tree, i.e. each bridge performs the process of sending the BPDU message, similar to the bridge A. Each bridge in the network receives the BPDU message from each of the other bridges, and according to the received BPDU message, determines and stores the new root path cost, MAX_MAC, and corresponding root port information of each of the other bridges.

In the network shown in FIG. 5, the root bridge ID, shortest path cost (root path cost), MAX_MAC, and designated Bridge ID information determined by a part of the bridges are shown in Table 2.

TABLE 2

|  | Receiving Bridge | | | | | | |
| --- | --- | --- | --- | --- | --- | --- | --- |
|  | E | H | O | C | M | D | B | B |
| Root Bridge ID | A | A | A | A | A | A | O | A |
| Shortest Path Cost | 5 | 8 | 10 | 14 | 11 | 12 | 5 | 15 |
| Maximum Bridge Address in the Path | 0 | E | H | O | N | O | L | O |
| Designated Bridge ID | A | E | H | O | N | L | D | D |

In the method provided by the present invention, each receiving bridge (including root bridges and other bridges) determines the root port corresponding to the root bridge in the following manner.

1. The receiving bridge firstly compares the root path costs to the root bridge calculated by each port, i.e. the total path costs to the root bridge in the paths of each port. If the total path costs to the root bridge in each path are not equal, the port corresponding to the path with a minimum total path cost is selected as the root port corresponding to the root bridge. For example, L receives the BPDU from the root bridge A at two ports, respectively, and calculates the total path costs that the total path cost from the port corresponding to O is 11 and the total path cost from the port corresponding to D is 13. Therefore, for the root bridge A, L selects the port connected to O as the root port.

2. If the total path costs to the root bridge calculated by the receiving bridge at each port are equal, and the designated Bridge IDs are different, the maximum bridge IDs (MAX_MAC) in the paths of each port, i.e. maximum MAC addresses in the paths of each port are compared. If the maximum MAC addresses in each path are different, the port corresponding to the path with the maximum MAC address is selected as the root port corresponding to the root bridge.

For example, in the network shown in FIG. 5, there are two equal paths from A to D: A-E-H-O-L-D and A-E-G-N-M-D, which are the paths with the lowest total path costs among all the paths. The maximum MAC address in the path A-E-H-O-L-D is O, whereas the maximum MAC address in the other path A-E-G-N-M-D is N. The two paths have equal total path cost. The two paths from D to A are in the same situation. Because O>N, as for the bridge D, if A is taken as the root, the block point is located at the M-D port. On the contrary, if D is taken as the root, E is blocked at G-E, so that A-D and D-A will select the symmetric path A-E-H-O-L-D. Similarly, in the two equivalent paths of B-C-J-O and B-D-L-O, because L>J, B and O will select the symmetric path B-D-L-O through similar way of determination.

3. If the total path costs to the root bridge calculated by the receiving bridge at each port are equal, the designated Bridge IDs are different, and the MAX_MACs are the same, the root port corresponding to the root bridge is selected in the following manner.

The receiving bridge receives the BPDU message from the root bridge Y at two or more ports, and the root path costs calculated at each port are equal to each other and minimum compared with other paths, but the MAX_MACs carried in the BPDUs are the same bridge X, in which X is uncertain. Under such a circumstance, the receiving bridge queries path-selection information of the spanning tree between this bridge and the bridge X as the root bridge, i.e. the root port selection information of the spanning tree corresponding to the root bridge X on this bridge. According to the above path-selection information, the root port of the root bridge Y on the receiving bridge is determined, and the bridge X is recorded into the MAX_MAC in the database corresponding to the root bridge Y on the bridge.

For example, in the network shown in FIG. 5, there are two equivalent paths from A to B: A-E-H-O-J-C-B and A-E-H-O-L-D-B, the maximum MAC address in the two paths are both O, which is the above bridge X. At this time, B needs to query the root port selection information of the spanning tree corresponding to the root bridge O on this bridge, and select the root port corresponding to the root bridge A on this bridge, according to a query result.

The network in FIG. 5 is a multi-path bridge, i.e. the entrance bridge paths are established by taking each bridge as a root, B, D, O, M, H . . . . These bridges take themselves as the root and send BPDU messages with themselves as the root to the directly-connected bridges from themselves. While determining the root ports, the directly-connected bridges forward the BPDUs corresponding to the root ports towards other non-root ports. Meanwhile, the directly-connected bridges also select the root port and designated ports to other bridges, and establish shortest paths to other bridges. The path from B to A actually relies on the path from B to O. The configured BPDU packet taking A as the root firstly passes through O and then reaches B. Under a general situation, B has established an optimum path from O to B by taking O as the root, that is, B should have selected a certain port as the root port corresponding to the root bridge O. When the configured BPDU taking the bridge O as the root reaches B, upon comparison (because L>J), B selects the port from D as the root port, and blocks the C-B port. Finally, B will select the path A-E-H-O-L-D-B. That is, the port from B to D is selected as a port corresponding to the root bridge A. Similarly, the path from B to A is also determined by the above principle, the finally selected path is consistent, and A selects the symmetric path B-D-L-O-H-E-A.

If the path-selection information between the bridge and the bridge X is not determined a timer with a duration of 2-3 hello time durations is set, and meanwhile, the configuration information of the root bridge is continuously sent out via other ports. Then, the path-selection information between the bridge and the bridge X is waited for being determined, i.e. waiting for the BPDU taking the bridge X itself as the root bridge to reach the bridge B. If the above timer times out for many times, it indicates that a certain problem occurs to the two shortest paths between the bridge X and the bridge.

For example, in the network in FIG. 5, B receives the BPDU of the root bridge A from C and D, respectively. The MAX_MACs carried in the BPDU are the bridge O. However, B has not established root port selection information by taking O as the root bridge, so that B continues to send the BPDU out via other ports and sets a timer to wait for the configured BPDU with O as the root to arrive at. After the configured BPDU with O as the root arrival, if the root port obtained by the BPDU is not any port associated with the equivalent shortest paths, the root port information obtained through query is dropped, and B continues to wait for other configured BPDUs with O as the roots to reach, and continues to query the configured BPDU. Then, B changes the port if preferable information appears later on and sends the preferable information to other ports.

Figure 6:
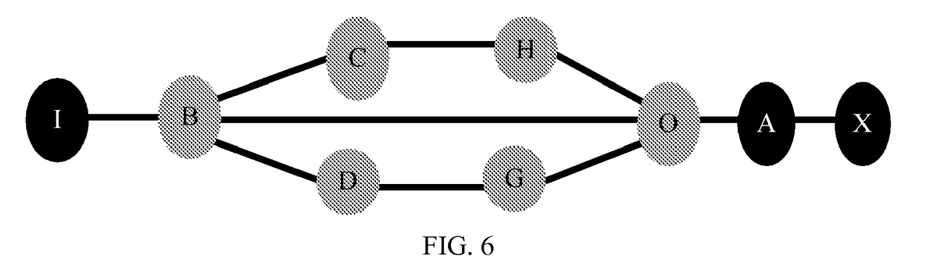
FIG. 6 is a schematic view of a network structure connected through Ethernet bridges.

For example, as shown in FIG. 6, in the network interconnected through Ethernet bridges, the paths O-H-C-B and O-G-D-B have the same path cost. The directly-connected path cost of the path B-O is larger than the path costs of the paths O-H-C-B and O-G-D-B. O has the maximum bridge ID. The bridge IDs are arranged in an order of letters: A<B<C< . . . <E<H<I< . . . <O, according to the alphabetic sequence. For example, A creates a spanning tree by taking itself as the root and begins to send BPDU to O, and the BPDU is transmitted to B hop-by-hop, according to the above manner.

O is also started according to the above manner and sends the BPDU O as the root, but it is slightly later than the tree A. Upon receiving two BPDUs about the root bridge A, B learns that there are two shortest paths to A. The priority vectors in the two shortest paths have the same "maximum MAC value" (i.e. the bridge ID value of bridge O). Therefore, the root port cannot be directly determined. Then, B queries the root port information O as the root.

Because the example of the spanning tree O as the root is started later, B merely receives the BPDU from the root bridge O at the port P3. In this way, as the root port cannot be directly determined due to the two shortest equivalent paths about the tree A, B queries the root port of the tree O, and if the obtained root port is not any port associated with the equivalent shortest paths, B drops the queried root port information, and continues to wait other configured BPDUs, and meanwhile, transmits the configured BPDU of the updated root bridge A downwards.

If the path-selection information between the bridge and a certain root bridge X is not adapted to determine the root port due to some errors, such as dropping or delaying of a message, after the correct BPDU of the root bridge (taking the bridge X as the root) transmitted from an upstream bridge arrival, on the bridge, the root port selection information corresponding to the root bridge needs to be modified. Meanwhile, the bridge further needs to query path-selection information of other root bridges associated with the bridge X and with equivalent paths, and makes corresponding updating. Meanwhile, the bridge queries path-selection information of other root bridges associated with the bridge X in the database. That's because if the root port selection information of a certain root bridge at this bridge may rely on the just modified bridge X, i.e. X is a MAX_MAC in the path from a certain root bridge to the bridge, and the path is the shortest one, the previous port information may be incorrect and also need to be modified.

For example, in the network shown in FIG. 6, there are two shortest equivalent paths from B to A, i.e. A-O-H-C-B and A-O-G-D-B. The maximum MAC addresses in the two paths are both O. At this time, B cannot determine to select which port directly according to the path cost and the MAX_MAC, B needs to query the corresponding port selection information (the path-selection information of B) with O as the root bridge. Due to a certain reason, C drops or delays the configured BPDU with O as the root bridge. At this time, B merely receives the configured BPDU with O as the root from D, so that B definitely selects D-B when selecting corresponding root port taking O as the root bridge. Then, B also turns to O as a reference when selecting a corresponding port with A as the root bridge, and prefers the ports connected to D. When the next configured BPDU with O as the root bridge passes through H and C to reach B, B compares the path cost from the port (C-B) with that from D and finds out that both the path costs are equal to each other. Furthermore, the MAX_MACs in the paths O-H-C-B and O-G-D-B are, respectively, H and G, and it is determined that H>G after comparison. Then, B modifies the path-selection information of the port taking O as the root bridge. Meanwhile, B queries the information about the bridge O in the database. If the information of a certain root bridge on B relies on O, i.e. O is the MAX_MAC in the configured BPDU of a certain root bridge, the corresponding previous port information may be incorrect, and also needs to be modified.

For example, the root port information on B corresponding to the root bridge A relies on the root port information on B corresponding to the root bridge O, so that the root port information on B corresponding to the root bridge A needs to be modified. If the root port information on B corresponding to a plurality of root bridges relies on the root port information on B corresponding to the root bridge O, it also needs to be modified. Similarly, if A has a larger MAC address than O and the port selection information of another root bridge X on B relies on A, and A is further a maximum MAC address in the shortest path from the root bridge X to the bridge B, the path-selection information of the root port on the bridge B corresponding to the root bridge X further needs to be modified. It is a query and modification process in a nests loop. Of course, all the operations are finished on the bridge B, which merely include querying the database and modifying the information in the database. Therefore, problems associated with different trees caused by different generation time have been solved.

4. If the total path costs to the root bridge calculated by the receiving bridge at each port are equal to each other and the designated Bridge IDs are also equal to each other, it indicates that each equivalent path crosses over the same bridge. Therefore, the local bridge IDs at two endpoints of the equivalent paths are compared to find out the bridge with a smaller bridge ID. Then, as for the bridge with the smaller bridge ID, two Port IDs associated with each shortest path are compared. The shortest path connecting to the port with the smaller Port ID is taken as the path to the root bridge.

Figure 7:
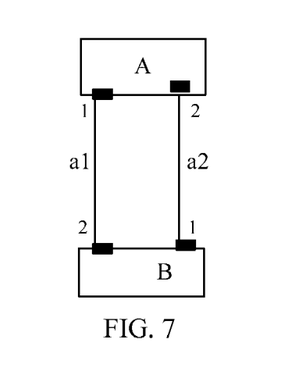
FIG. 7 is a schematic view of a network structure connected through Ethernet bridges.

For example, as shown in FIG. 7, in the network interconnected through Ethernet bridges, a1 and a2 represent costs of two links. If a1=a2, two equivalent paths exist between the bridges A and B, and the two equivalent paths pass over the same two bridges. Hence, the bridge ID of the bridge A is compared with that of the bridge B, and herein, A is smaller than B, so that two associated port IDs on the bridge A are compared with each other. Port_A_1 is corresponding to Port_B_2 and Port_A_2 is corresponding to Port_B_1. After comparing the two Port IDs on A, the bridge B selects Port_B_2 as the root port, and after the same comparison, A selects Port_A_1 as the root port. In this manner, both A and B select the same path.

The method of selecting the path to the root bridge through comparing the maximum or minimum bridge IDs in the paths provided by the present invention is also suitable for the IS-IS protocol. The IS-IS protocol establishes a symmetric spanning tree through the method of the present invention, which is described below in detail.

When the spanning tree is established by IS-IS, the IS-IS is required for establishing adjacency relationship between bridges and exchanging the link state advertisements (LSA). For example, in the network interconnected through Ethernet bridges in FIG. 8, each letter represents the MAC address of each bridge, and A<B<C . . . <L<M<N<O, and the number on the line segment represents a port path cost.

Figure 8:
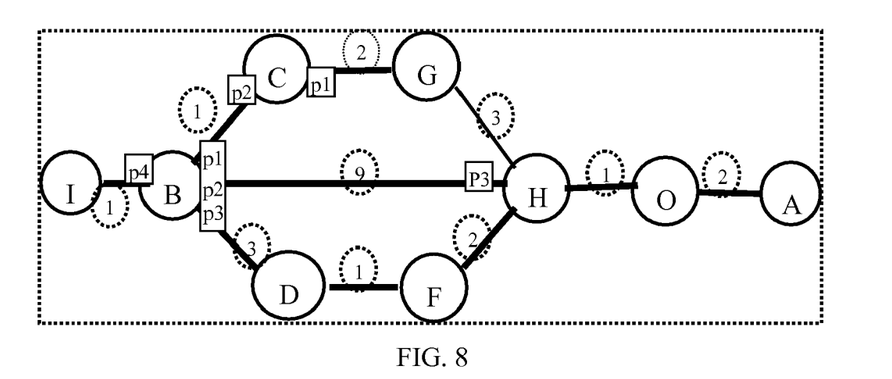
FIG. 8 is a schematic view of a network structure connected through Ethernet bridges.

H establishes the adjacency relationship with O, G, F, and B, and after LSAs have been exchanged, LSA information in Table 3 may be obtained.

TABLE 3

| | Directly-connected bridge ID | | | |
| --- | --- | --- | --- | --- |
| | O | G | F | B |
| H | 1 | 3 | 2 | 9 |
| Ports Corresponding to H | Hp4 | Hp1 | Hp3 | Hp2 |

Likewise, every two interconnected directly-connected bridges exchange the link state information. For example, B may obtain LSA information received from the directly-connected bridge as shown in Table 4.

TABLE 4

| | Directly-connected bridge ID | | | |
| --- | --- | --- | --- | --- |
| | I | C | D | H |
| B | 1 | 1 | 3 | 9 |
| Ports Corresponding to B | Bp4 | Bp1 | Bp3 | Bp2 |

Every bridge collects the path cost information of any bridge directly-connected thereto and floods the information to its neighbors. Through exchanging and flooding, when the whole topology becomes stable, every bridge in the same domain stores the path costs of any two directly-connected bridges, and every bridge stores the path cost information as shown in Table 5.

TABLE 5

| | port | | | | | | | | |
| --- | --- | --- | --- | --- | --- | --- | --- | --- | --- |
| Cost | A | B | C | D | F | G | H | I | O |
| A | | | | | | | | | 2 |
| B | | | 1 | 3 | | | 9 | 1 | |
| C | | | | | | 2 | | | |
| D | | | | | 1 | | | | |
| F | | | | | | | 2 | | |
| G | | | | | | | 3 | | |
| H | | | | | | | | | 1 |
| I | | | | | | | | | |

Currently, a method of constructing a shortest path tree based on the path cost information stored in every bridge is described as follows. The shortest paths from V0 to each node in a non-descending sequence are constructed one by one, in which the first step is to find out a node closest to V0 and a path to the node; the second step is to find out a node secondary closest to V0 and a path to the node, and so forth; finally, all the shortest paths from V0 to all nodes are found out, so as to construct a whole shortest path tree. However, simply by this method, when there are two or more equivalent paths from V0 to a certain bridge, the path of the symmetric tree cannot be determined.

If the bridge has constructed a whole shortest path tree with itself as the root according to the above method, the root port, designated port, and non-designated port corresponding to the bridge with another bridge as the root bridge have been determined accordingly.

Taking B as an example, first, B gets to know which bridges are directly-connected thereto, i.e. C, D, H, and I. According to the above method, B establishes the shortest path tree with itself as the root through the manner shown in Table 6.

TABLE 6

| Set of Candidate Paths | Path Length | Set A | Shortest Path | Maximum MAC in the Shortest Path | Port Corresponding to the Shortest Path | Descriptions |
|---|---|---|---|---|---|---|
| BI<br>BD<br>BC<br>BH | 1<br>3<br>1<br>9 | B | Null | Null | Null | In an initial state, the shortest path tree merely has the node B, the candidate path is just the path represented by the line segment directly-connected to B. |
| BD<br>BH<br>BCG | 3<br>9<br>3 | B,<br>I, C | BI<br>BC | Null<br>Null | P4<br>p1 | BI and BC are shortest among all the candidate paths, so taken into the shortest path tree; and B, I and C are taken into the set A. When all end points of the line segments starting from the nodes I and C just taken into the set A are considered, I does not have such end points, whereas C merely has G. As for nodes not collected in the set A, there is merely the node G, so that the value of the path BCG, starting from B, passing through the node C and reaching the node G, is calculated. Because no candidate paths have the path to G, the BCG path is directly put into the set of candidate paths. |
| BDF<br>BGH | 4<br>6 | B,<br>I,<br>C,<br>D, G | BI<br>BC<br>BD<br>BCG | Null<br>Null<br>Null<br>C | P4<br>P1<br>P3<br>p1 | BCG and BD are the shortest among all the candidate paths, so they are put into the set of shortest paths. D and G are taken into the set A. When all end points of the line segments starting from the nodes of the shortest paths are considered, there are respectively H and F. Through calculation, it is found that BGH = 6 and BDF = 4. There are two paths from B to H, and BGH is the shortest one among all candidate paths, so that the BH is removed from the candidate paths. |
| BGH | 6 | B,<br>I,<br>C,<br>D,<br>G, F | BI<br>BC<br>BD<br>BCG<br>BDF | Null<br>Null<br>Null<br>C<br>D | P4<br>P1<br>P3<br>P1<br>p3 | Among the above candidate paths, BDF is the shortest one. And F is not in the set A, so that F is then put into the set A. When all end points of the line segments starting from F that are put into the set A are considered, there is H. Through calculation, it is found that BFH = 6, so that BFH is put into the candidate paths. So that, two equivalent paths BFH and BGH exist in the candidate paths. |
| BGH<br>BFH | 6<br>6 | B,<br>I,<br>C,<br>D,<br>G,<br>F, H | BI<br>BC<br>BD<br>BCG<br>BDF<br>BGH | Null<br>Null<br>Null<br>C<br>D<br>G | P4<br>P1<br>P3<br>P1<br>p3<br>p1 | There are two candidate paths to H with the same path costs. According to the routing algorithm such as OSPF, both of them need to be stored. In order to solve the problem about the MAC address learning, two bridges B and H need to generate the symmetric tree. The maximum (minimum) MAC address in the path is obtained by comparison, G > D, so that the BGH is selected as the unique path, and the corresponding port in the bridge B is Bp1. |

TABLE 6-continued

| Set of Candidate Paths | Path Length | Set A | Shortest Path | Maximum MAC in the Shortest Path | Port Corresponding to the Shortest Path | Descriptions |
|---|---|---|---|---|---|---|
| BHO | 7 | B, I, C, D, G, F, H, O | BI BC BD BCG BDF BGH | Null Null Null C D G | P4 P1 P3 P1 p3 p1 | When the end points of line segments starting from H that is just put into the set A are considered, there is the unique node O, and BHO = 7, which is put into the candidate paths. Because there is only one path, O is also selected into the set A. Similarly, the node A is also selected into the set A. |
| | | B, I, C, D, G, F, H, O, A | BI BC BD BCG BDF BGH BGHO BGOA | Null Null Null C D G H O | P4 P1 P3 P1 p3 p1 P1 P1 | Through successive comparison, B has established the shortest paths to all the other nodes, and the corresponding total path costs, the maximum MAC addresses on the path and the corresponding ports of the paths on the bridge are shown in Table 6. |

Every bridge calculates optimum paths to the other bridges, determines the corresponding root port selection information by taking other bridges as the root bridge, according to the optimum paths on the bridge, informs the corresponding directly-connected bridge about the root port selection information, and makes the directly-connected bridges determine the corresponding designated ports. Taking B as an example, the established shortest paths to the other bridges and the port information corresponding to the paths are shown in Table 7. The ports are also the root ports corresponding to root bridges.

TABLE 7

| | B | | | | | | | |
|---|---|---|---|---|---|---|---|---|
| | A | C | D | F | G | H | I | O |
| Path Cost to B and Maximum Bridge ID in the Path | 9/O | 1/null | 3/null | 4/D | 4/C | 6/G | I/null | 7/H |
| Port Corresponding to B | Bp1 | Bp1 | Bp3 | Bp3 | Bp1 | Bp1 | Bp4 | Bp1 |

When B determines that the corresponding root port of C, G, H, O and A on B is Bp1, the corresponding root port of D and G on B is Bp3, and the root port of I on B is Bp4, B informs the other directly-connected bridges (C, D, I) about the corresponding port selection information through these ports, so that the designated port information with the other bridges as the root may be established on the bridge C. Therefore, corresponding to the bridge C, after receiving the corresponding information of C, G, H, O and A from Cp2, C may determine that Cp2 is the designated port corresponding to the root bridges C, G, H, O and A. Similarly, D may determine that Dp2 is the designated port ID corresponding to the root bridges D and F; but Bp2 and Hp3 ports are neither the root ports corresponding to any root bridge, nor the designated ports corresponding to the root bridge, they are not received and do not forward any user data. Similarly, the bridges D, F . . . calculate the shortest paths to the other bridges on the bridge. Therefore, every bridge determines the corresponding root ports with the other bridges as the root at the bridge, and that informs the other corresponding directly-connected bridges to determine the designated ports thereof, thereby determining the shortest path tree among all the bridges.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for a root path calculation in a shortest path bridge comprising:

receiving, by a non-root bridge, a configuration message carrying a priority vector sent by the root bridge, wherein one of initial maximum and minimum bridge ID information along a path is set in the priority vector; and reconstructing, by the non-root bridge, the priority vector, according to the received configuration message, and determining and storing information of a root port and the root path corresponding to the root bridge according to total path cost information and one of the initial maximum and minimum bridge ID information along the path contained in the reconstructed priority vector;

Wherein the process of reconstructing, by the non-root bridge, a priority vector according to the received configuration message further comprises:

resetting and storing, by the non-root bridge, the maximum or minimum bridge ID information along the path in the priority vector in the configuration message after receiving the configuration message from the root bridge at each port;

and wherein the process of resetting and storing, by the non-root bridge, the maximum or minimum bridge ID information along the path in the priority vector in the configuration message further comprises:

setting the bridge ID of the non-root bridge as the maximum bridge ID along the path in the reconstructed priority vector when the maximum bridge ID is adopted to select the root path corresponding to the root bridge and the bridge ID of the non-root bridge is larger than a maximum bridge ID along the path carried in the configuration message; and setting the bridge ID of the non-root bridge as the minimum bridge ID along the path in the reconstructed priority vector when the minimum bridge ID is adopted to select the root path corresponding to the root bridge and the bridge ID of the non-root bridge is smaller than a minimum bridge ID along the path carried in the configuration message.

2. The method according to claim 1, wherein the process that one of the initial maximum and minimum bridge ID information along the path is set in the priority vector, further comprises:

setting, by the root bridge, all bits of the initial maximum bridge ID information along the path as zero in the priority vector, when the maximum bridge ID is adopted to select a root path corresponding to the root bridge; and setting, by the root bridge, all bits of an initial minimum bridge ID along the path as F in the priority vector, when the minimum bridge ID is adopted to select the root path corresponding to the root bridge.

3. The method according to claim 2, wherein the bridge ID comprises one of a Medium Access Control (MAC) address of a bridge and a unique bridge mark preset in a domain.

4. The method according to claim 1, wherein the process of reconstructing, by the non-root bridge, the priority vector according to the received configuration message, and determining and storing the information of the root port and the root path corresponding to the root bridge, according to the total path cost information and one of the initial maximum and minimum bridge ID information along the path contained in the reconstructed priority vector further comprises:

resetting and storing, by the non-root bridge, a total path cost, a designated bridge ID and a designated bridge port in the priority vector in the configuration message, after receiving the configuration message from the root bridge at each port; and comparing, by the non-root bridge, the total path cost information with one of the initial maximum and minimum bridge ID information along the path in each reconstructed priority vector, determining and storing information of the root port corresponding to the root bridge according to the comparison result, and sending the configuration message carrying the reconstructed priority vector via a non-root port.

5. The method according to claim 2, wherein the process of reconstructing, by the non-root bridge, the priority vector, according to the received configuration message, and determining and storing the information of the root port and the root path corresponding to the root bridge, according to the total path cost information and one of the initial maximum and minimum bridge ID information along the path contained in the reconstructed priority vector, further comprises:

resetting and storing, by the non-root bridge, a total path cost, a designated bridge ID and a designated bridge port in the priority vector in the configuration message after receiving the configuration message from the root bridge at each port; and comparing, by the non-root bridge, the total path cost information with one of the initial maximum and minimum bridge ID information along the path in each reconstructed priority vector, determining and storing information of the root port corresponding to the root bridge according to the comparison result, and sending the configuration message carrying the reconstructed priority vector via a non-root port.

6. The method according to claim 3, wherein the process of reconstructing, by the non-root bridge, the priority vector, according to the received configuration message, and determining and storing the information of a root port and a root path corresponding to the root bridge, according to total path cost information and one the initial maximum and minimum bridge ID information along the path contained in the reconstructed priority vector, further comprises:

resetting and storing, by the non-root bridge, a total path cost, a designated bridge ID and a designated bridge port in the priority vector in the configuration message, after receiving the configuration message from the root bridge at each port; and comparing, by the non-root bridge, the total path cost information with one of the initial maximum and minimum bridge ID information along the path in each reconstructed priority vector, determining and storing information of the root port corresponding to the root bridge, according to the comparison result, and sending the configuration message carrying the reconstructed priority vector via a non-root port.

7. The method according to claim 1, wherein the process of determining and storing, by the non-root bridge, information of a root port corresponding to the root bridge according to a comparison result further comprises:

selecting a port where the configuration message, corresponding to the priority vector containing one of the maximum and minimum bridge ID along the path, passes as the root port corresponding to the root bridge when the priority vectors reset by the non-root bridge comprise a plurality of priority vectors with an equal minimum total path cost, different designated bridge IDs, and one of different maximum and minimum bridge IDs along the path.

8. The method according to claim 1, wherein the process of determining and storing, by the non-root bridge, information of the root port corresponding to the root bridge, according to the comparison result further comprises:

determining the root port corresponding to the root bridge according to path-selection information of the bridge corresponding to one of the maximum and minimum bridge ID along the path corresponding to the non-root bridge when each of the priority vectors reset by the non-root bridge contains a plurality of priority vectors with an equal minimum total path cost, different designated bridge IDs, and one of the same maximum and minimum bridge IDs along the path.

9. The method according to claim 8, wherein the process of determining the root port corresponding to the root bridge, according to the path-selection information of the bridge corresponding to one of the maximum and minimum bridge ID, along the path corresponding to the non-root bridge further comprises:

continuing to send out the configuration message carrying the reconstructed priority vector and then determining, by the non-root bridge, the root port corresponding to the root bridge, according to the subsequently-determined path-selection information, when the path-selection information of the bridge corresponding to one of the maximum and minimum bridge ID along the path corresponding to the non-root bridge is not determined.

10. The method according to claim 8, wherein the process of determining the root port corresponding to the root bridge according to path-selection information of the bridge corresponding to one of the maximum and minimum bridge ID along the path corresponding to the non-root bridge further comprises:

updating the path-selection information, according to the subsequently received configuration message, and determining the root port corresponding to the root bridge, according to the updated path-selection information, when the root port of the bridge corresponding to one of the maximum and minimum bridge ID along the path corresponding to the non-root bridge determined according to the path-selection information is not a port associated with the priority vector containing a minimum total path cost.

11. The method according to claim 10, wherein the process of determining the root port corresponding to the root bridge, according to the updated path-selection information, comprises:

updating root port selection information of the non-root bridge corresponding to other bridges and of relying on the path-selection information before updating, after updating the path-selection information of the bridge corresponding to one of the maximum and minimum bridge ID along the path corresponding to the non-root bridge.

12. The method according to claim 1, wherein the process of determining and storing, by the non-root bridge, information of the root port corresponding to the root bridge, according to the comparison result, comprises:

selecting a port corresponding to a minimum relevant port number at an endpoint with a smaller bridge ID in two endpoints of the relevant equivalent path of the priority vector as the root port corresponding to the root bridge when each of the priority vectors reset, by the non-root bridge, contains a plurality of priority vectors with an equal minimum total path cost, the designated bridge ID, and one of the maximum and minimum bridge ID along the path.

13. The method according to claim 1, wherein the process of determining and storing, by the non-root bridge, information of the root port corresponding to the root bridge according to a comparison result comprises:

selecting a port where a configuration message, corresponding to the priority vector with the minimum total path cost, passes as the root port corresponding to the root bridge when each of the priority vectors reset by the non-root bridge contains a priority vector with a minimum total path cost.

14. The method according to claim 1, further comprising:
establishing an adjacency relationship between each of pair-wise interconnected bridges in a network, exchanging link state advertisements (LSAs) between the pair-wise interconnected bridges, each of the pair-wise interconnected bridges obtains and stores link state information of all the pair-wise interconnected bridges in the network; and selecting a path of a bridge corresponding to one of the maximum and minimum bridge ID along the path as a root path to other root bridges, when every bridge in the network calculates a plurality of paths with a minimum total path cost to the other root bridges, according to the stored link state information.

15. The method according to claim 14, further comprising:
sending, by each bridge, information of the root port of the bridge with respect to the other root bridges to an adjacent directly-connected bridge after calculating, by every bridge, the root path to the other root bridges and the root port corresponding to the root path, wherein, according to the received information of the root port, and according to the received root port information, the directly-connected bridge determines designated port selection information of the other root bridges in the adjacent directly-connected bridge.

* * * * *